United States Patent
Ach

(10) Patent No.: US 7,882,935 B2
(45) Date of Patent: Feb. 8, 2011

(54) SUPPORT MEANS SYSTEM WITH DRIVE PULLEY AND SUPPORT MEANS AS WELL AS ELEVATOR INSTALLATION WITH SUCH A SUPPORT MEANS SYSTEM

(75) Inventor: Ernst Ach, Ebikon (CH)

(73) Assignee: Inventio AG, Hergiswil NW (CH)

( * ) Notice: Subject to any disclaimer, the term of this patent is extended or adjusted under 35 U.S.C. 154(b) by 704 days.

(21) Appl. No.: 11/550,962

(22) Filed: Oct. 19, 2006

(65) Prior Publication Data

US 2007/0093334 A1  Apr. 26, 2007

Related U.S. Application Data

(60) Provisional application No. 60/729,627, filed on Oct. 24, 2005.

(30) Foreign Application Priority Data

Oct. 21, 2005  (EP)  .................. 05109821

(51) Int. Cl.
  *B66B 11/04*   (2006.01)
  *F16G 5/00*   (2006.01)
(52) U.S. Cl. .......... 187/251; 474/238; 474/261
(58) Field of Classification Search .......... 187/251; 474/237, 238, 260–264
  See application file for complete search history.

(56) References Cited

U.S. PATENT DOCUMENTS

| | | | |
|---|---|---|---|
| 4,047,446 A | 9/1977 | Speer | |
| 4,305,713 A * | 12/1981 | Imamura | 474/238 |
| 4,330,287 A * | 5/1982 | Fischer | 474/238 |
| 4,591,025 A * | 5/1986 | Honda | 187/266 |
| 5,055,090 A | 10/1991 | Miranti, Jr. | |
| 5,308,291 A | 5/1994 | Robertson et al. | |
| 5,492,507 A * | 2/1996 | Kumazaki | 474/205 |
| 5,803,855 A | 9/1998 | Russell | |
| 6,371,448 B1 * | 4/2002 | De Angelis | 254/374 |
| 7,757,817 B2 * | 7/2010 | Ach | 187/251 |
| 2002/0165058 A1 * | 11/2002 | Swope | 474/260 |
| 2007/0060430 A1 * | 3/2007 | Alden et al. | 474/237 |
| 2007/0084671 A1 * | 4/2007 | Ach | 187/261 |
| 2008/0116014 A1 * | 5/2008 | Ach | 187/252 |
| 2008/0314691 A1 * | 12/2008 | Mustalahti et al. | 187/254 |
| 2009/0166132 A1 * | 7/2009 | Ach | 187/254 |

FOREIGN PATENT DOCUMENTS

| | | |
|---|---|---|
| EP | 1 555 234 A1 | 7/2005 |
| EP | 1 561 720 A2 | 8/2005 |
| JP | 2007112629 A * | 5/2007 |

* cited by examiner

*Primary Examiner*—Evan H Langdon
(74) *Attorney, Agent, or Firm*—Fraser Clemens Martin & Miller LLC; William J. Clemens

(57) ABSTRACT

A support system has a belt-like support, which supports a load and which has at least one rib or groove with wedge-shaped cross-section extending in the longitudinal direction of the support, is driven by a support pulley, which pulley has at least one corresponding groove or rib with wedge-shaped cross-section extending in a circumferential direction, wherein a cavity is present between a rib crest of the wedge-shaped ribs and a corresponding groove base when the support rests on the support pulley.

19 Claims, 3 Drawing Sheets

SUPPORT MEANS SYSTEM WITH DRIVE PULLEY AND SUPPORT MEANS AS WELL AS ELEVATOR INSTALLATION WITH SUCH A SUPPORT MEANS SYSTEM

CROSS-REFERENCE TO RELATED APPLICATION

This application claims the benefit of U.S. provisional patent application Ser. No. 60/729,627, filed Oct. 24, 2005.

BACKGROUND OF THE INVENTION

The present invention relates to a support means system, which comprises a drive pulley and a belt-like support means and serves for moving a load, as well as an elevator installation with such a support means system. Fields of use for such a support means system are, for example: supporting and drive systems for cars of passenger and goods elevators, for mining conveying equipment, for elevatoring devices of high-bay warehouse vehicles, for elevatoring devices of stacking vehicles, for elevatoring equipment in conveying systems of production lines and packaging lines, for brush elevatoring equipment in washing installations, for elevatoring equipment in fitness training apparatus, etc. The support means system is also suitable for, for example, use as a conveyor belt of belt conveyors or belt excavators.

The support means system according to the present invention is described in the following on the basis of use thereof as a support means system of an elevator installation.

Elevator installations usually comprise an elevator car and a counterweight, which are movable in an elevator shaft or along free-standing guide devices. For generating the movement, the elevator installation comprises a drive unit with at least one drive element in the form of a drive pulley, wherein the drive pulley supports the elevator car and the counterweight by way of at least one flexible supporting and/or drive means and transmits the requisite drive forces thereto. Necessary additional deflections of the supporting and drive means are usually realized by deflecting elements in the form of deflecting pulleys.

The supporting and/or drive means is termed simply support means in the following and where the description refers not only to drive pulleys, but also to deflecting pulleys these are called support means pulleys. However, it is not essential for the drive means pulleys to have an actual pulley shape; these can also have the shape of a shaft or axle.

An elevator installation is shown in European patent document EP 1 555 234 A1 in which wedge-ribbed belts are used in support means for the elevator car. These belts comprise a belt body of flat-belt kind, which is produced from resilient material (rubber, elastomer) and which has on the running surface thereof facing the drive pulley several ribs extending in a belt longitudinal direction. These ribs co-operate with corresponding grooves in the periphery of drive or deflecting pulleys in order on the one hand to guide the wedge-ribbed belts on the support means pulleys and on the other hand to increase the traction capability between the drive pulley and the support means. The ribs and grooves have triangular or trapezium-shaped, i.e. wedge-shaped, cross-sections. Tensile carriers consisting of metallic or non-metallic strands are embedded in the belt bodies of the wedge-ribbed belts to be oriented in belt longitudinal direction and impart the requisite tensile strength and longitudinal stiffness to the support means.

The elevator installation disclosed in EP 1 555 234 A1, in which wedge-ribbed belts are used as support means, has certain disadvantages. One of the disadvantages is that the wedge-ribbed belt does not attain an optimum drive capability and the resulting drive capability does not remain constant in the course of the operating life. This problem results from the fact that a substantial part, which is not, however, constant in the course of the operating time, of the radial forces transmitted by the wedge-ribbed belt to the drive pulley is transmitted not by way of the inclined flanks of the ribs and grooves, but in the region of the rib crests and groove bases in an approximately radial direction because the rib crests rest in the corresponding groove bases. This part of the radial forces, which is not clearly determinable and not constant, is not converted, or is converted only to a small extent, by wedge action between the inclined flanks into increased normal forces between belt and drive pulley. Moreover, in the case of the support means described in the cited state of the art the problem exists that dirt and belt abraded material are collected and compacted in the grooves of the support means pulleys and also in the grooves of the support means. This on the one hand has a consequence that at least in places the direct contact between the support means pulley and the belt is prevented, which strongly reduces the traction capability between a belt pulley and the support means. On the other hand, a thick contamination hardened in the groove base prejudices lateral guidance of the support means on the support means pulleys and in the extreme case leads to the support means being laterally displaced relative to the support means pulley or even the running surface leaving the support means pulley. Not only the loss of drive capability, but also the lateral displacement or the jumping-off of the support means from the support means pulley can lead to serious operational disturbances of the elevator installation.

A further disadvantage of the support means disclosed in EP 1 555 234 A1 is that faultless co-operation between the wedge-shaped ribs and grooves of the support means and the corresponding ribs and grooves of the support means pulley is disturbed when the support means is used in conjunction with support means pulleys having an extremely small outer diameter. The reason for that is that as a consequence of the high compressive stresses resulting as a consequence of support means curvature in the region of the rib crests of the support means the ribs deform in such a manner that they are displaced out of their correct position in the wedge-shaped grooves of the support means pulley. If the support means pulley is a drive pulley a reduction in traction capability can result therefrom.

SUMMARY OF THE INVENTION

The present invention has an object of creating a support means system of the kind described in the foregoing in which the stated disadvantages are not present. Moreover, the support means system according to the present invention shall be economical and save material.

The proposed solution substantially consists in that in the case of a support means system with a support means, which is of flat-belt type and which in the region of a running surface facing the drive pulley has at least one rib or groove which extends in the longitudinal direction of the support means and which co-operates with a corresponding groove or rib present in the support means pulley, the rib crest and/or the groove base at the support means or at the support means pulley is or are so formed that a cavity is present between the rib crest and the corresponding groove base when the support means rests on the support means pulley. It is achieved by this measure that no rib crest rests in the corresponding groove base, so that the radial forces mentioned in the foregoing are transmitted not in the region of the rib crest and/or the groove base, but by way of the inclined flanks of the rib or the groove, that contamination in the cavity is conducted away to where it cannot have any harmful effects and that the ribs of the support means can slightly expand in the cavity when their internal compressive stress, which is caused by the support means curvature, has reached a certain level.

Constant and defined traction values between a support means pulley acting as a drive pulley and the support means can be achieved if in the case of a support means resting on the support means pulley a rib or a groove of the support means contacts the corresponding groove or rib of the support means pulley exclusively in the region of the inclined flanks thereof.

A particularly simple form of embodiment of the present invention is that the rib crest of the rib of the support means and/or of the rib of the support means pulley is flattened in order to produce the cavity.

In a particularly wear-resistant form of embodiment of the present invention the rib crest of the rib of the support means and/or the rib crest of the rib of the support means pulley is provided with a rounding in order to produce the cavity, wherein the rounding radius of this rounding is greater than the rounding radius of any rounding which may be present at the groove base of the corresponding groove.

A form of embodiment particularly effective against contamination consists in that the groove base of the groove of the support means pulley has an encircling slot in order to produce the cavity, i.e. the groove base of the wedge-shaped groove of the support means pulley is deepened by an encircling slot.

Advantageously, the encircling slot has a rectangular or semicircular cross-section.

According to a particularly preferred form of embodiment of the present invention the support means has several parallelly arranged ribs or grooves with inclined flanks, which correspond with several parallel grooves or ribs with inclined flanks at the support means pulley, wherein the support means resting on the support means pulley under tensile stress contacts this exclusively in the regions of the inclined flanks.

Advantageous characteristics with respect to traction capability and lateral guidance of the support means on the support means pulley are achieved if the flank angle (β) present between the flanks of the ribs and grooves is at least 60° and at most 120°.

Excellent characteristics with respect to low noise and vibration-free running of the support means on the support means pulley are achieved if in the case of a support means with several ribs and grooves the widths of the said cavities are so selected that the sum of the widths, which are projected onto the axis of the support means pulley, of all contacting flanks of the wedge-shaped ribs or grooves is at most 70% of the total width of the support means.

In an advantageous manner the fact that the cavities in the region of the groove crests of the support means enable minimization of the minimum radius of curvature permissible for these support means is utilized in such a manner that the support means pulley has an outer diameter of less than 80 millimeters, preferably of less than 65 millimeters.

According to a particularly material-saving and economic form of embodiment of the present invention the support means pulley serving as the drive pulley is integrated in the driven shaft of a drive unit or coupled in the form of a support means drive shaft with the driven shaft. In both cases the drive pulley has the form of a shaft which is provided with at least one rib or groove and which can have a minimum outer diameter because thanks to the cavities according to the present invention between corresponding rib crests and groove bases the compressive stress, which arises in the ribbed crests due to the small support means curvature, is diminished and thereby the occurrence of slip is reduced.

DESCRIPTION OF THE DRAWINGS

The above, as well as other, advantages of the present invention will become readily apparent to those skilled in the art from the following detailed description of a preferred embodiment when considered in the light of the accompanying drawings in which.

DESCRIPTION OF THE PREFERRED EMBODIMENT

U.S. provisional patent application Ser. No. 60/729,627, filed Oct. 24, 2005, is hereby incorporated herein by reference.

Figure 1:
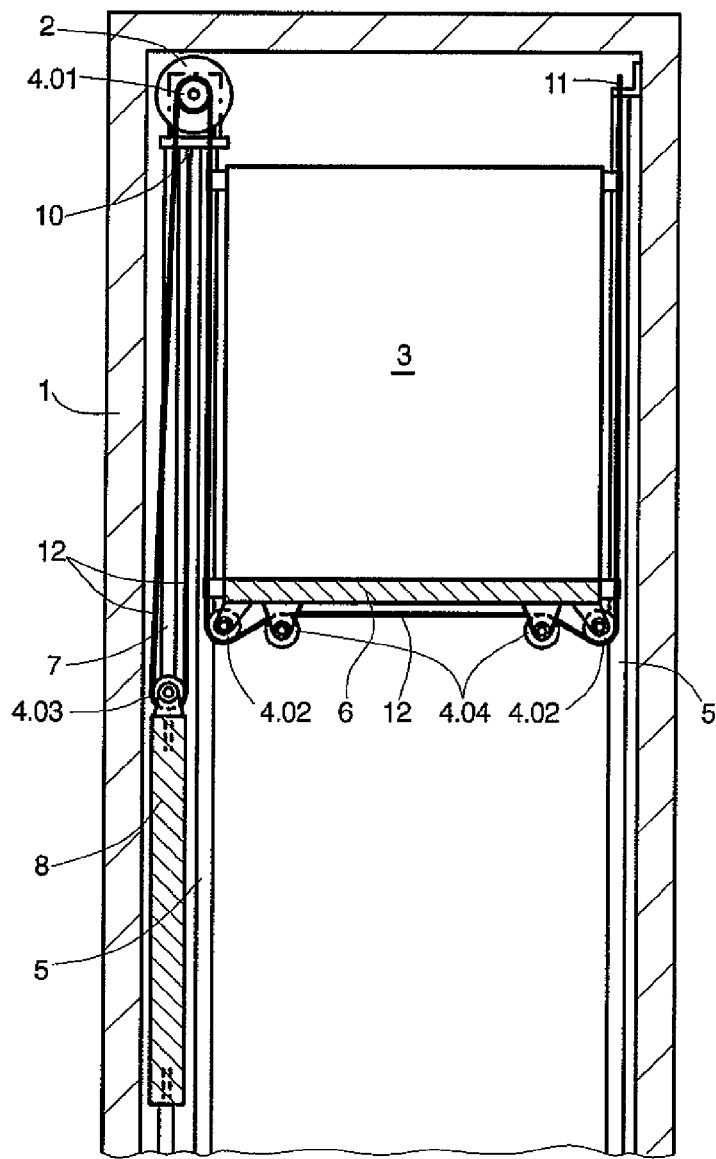
FIG. 1 is a vertical section through an elevator installation with a support means according to the present invention.

FIG. 1 shows a section through an elevator system according to the present invention, which is installed in an elevator shaft 1, with a support means according to the present invention. Essentially there are illustrated:

a drive unit 2, which is fixed in the elevator shaft 1, with a drive pulley 4.01, an elevator car 3, which is guided at car guide rails 5, with car support pulleys 4.02 mounted below the car floor 6, a counterweight 8, which is guided at counterweight guide rails 7, with a counterweight support pulley 4.03 and a belt-like support means 12, with at least one rib or groove extending in its longitudinal direction, which support means supports the elevator car 3 and the counterweight 8 and transmits the drive force from the drive pulley 4.01 thereto (in the case of an actual elevator installation at least two support means arranged in parallel are present).

The belt-like support means 12 is fastened at one of its ends below the drive pulley 4.01 to a first support means fixing point 10. From this it extends downwardly to the counterweight support pulley 4.03, loops around this pulley and extends from this out to the drive pulley 4.01, loops around this pulley and runs downwardly along the car wall at the counterweight side, loops around, on either side of the elevator car, a respective one of the car supports 4.02, which supports are mounted below the elevator car 3, in each instance through 90° and runs upwardly along the car wall remote from the counterweight 8 to a second support means fixing point 11.

The plane of the drive pulley 4.01 is arranged at right angles to the car wall at the counterweight side and its vertical projection lies outside the vertical projection of the elevator car 3. It is therefore important that the drive pulley 4.01 has a small diameter so that the spacing between the left-hand car wall and the wall, which is opposite thereto, of the elevator shaft 1 can be as small as possible. Moreover, a small drive pulley diameter enables use of a gearless drive motor with a relatively low drive torque as the drive unit 2.

The drive pulley 4.01 and the counterweight support pulley 4.03 are provided at their periphery with grooves formed to be complementary to the ribs of the support means 12. Where the support means 12 loops round one of the support means pulleys 4.01 and 4.03 its ribs lie in corresponding grooves of the support means pulley, whereby a perfect guidance of the support means on these drive means pulleys is guaranteed. Moreover, the traction capability is improved by a wedge effect arising between the grooves of the support means pulley 4.01, which serves as the drive pulley, and the ribs of the support means 12.

In the case of the support means under-looping below the elevator car 3 there is no lateral guidance between the car support pulleys 4.02 and the support means 12, since the ribs of the support means are disposed on its side remote from the car support pulleys 4.02. In order to nevertheless ensure lateral guidance of the support means, two guide pulleys 4.04 provided with grooves are mounted at the car floor 6, the grooves of these pulleys co-operating with the ribs of the support means 12 as a lateral guide.

Figure 2:
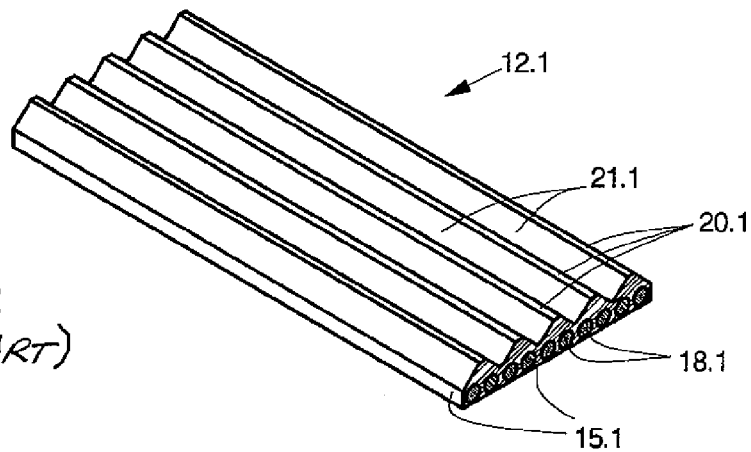
FIG. 2 is a perspective view of a support means with several ribs and grooves according to the known prior art.

FIG. 2 shows a detail of a wedge-ribbed belt 12.1, which serves as a support means, of an elevator installation according to the above-described the state of the art. A belt body 15.1, several wedge-shaped ribs 20.1 and grooves 21.1 and the tensile carriers 18.1 embedded in the belt body can be recognized.

Figure 3:
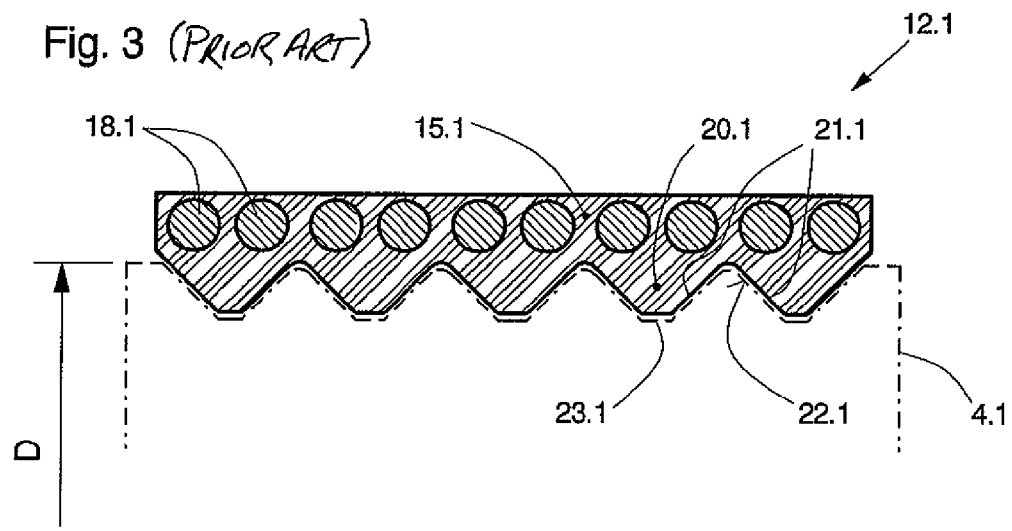
FIG. 3 is a sectional view through a first embodiment of a support means according to the known prior art.

FIG. 3 is a cross-section through the first support means 12.1 as is known from the above-identified prior art document. It comprises the belt body 15.1 and several of the tensile carriers 18.1 embedded therein. The belt body 15.1 is made of a resilient material. Natural rubber, or one of a plurality of synthetic elastomers, for example, is usable. The flat side of the belt body 15.1 can be provided with an additional cover layer or a worked-in fabric layer. The traction side, which co-operates with a drive pulley and optionally with deflecting pulleys, which are both termed support means pulleys in the following, of the belt body 15.1 has several of the web-shaped ribs 20.1 and the grooves 21.1 extending in a longitudinal direction of the support means 12.1. A support means pulley 4.1 is indicated by means of phantom lines, in the periphery of which with an outer diameter D are formed grooves 23.1 and ribs 22.1 corresponding with the ribs 20.1 and the grooves 21.1 of the support means 12.1.

Figure 4:
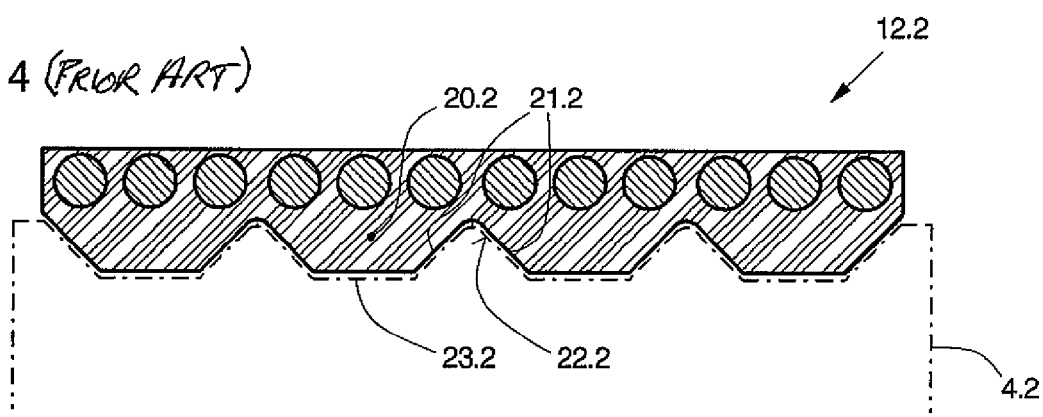
FIG. 4 is a sectional view through a second embodiment of a support means according to the known prior art.

FIG. 4 is a cross-section through a support means 12.2 similarly known from the above-identified prior art document, the wedge-shaped ribs in the support means being formed to be wider than the grooves. The basic construction and function of this support means 12.2, however, correspond with those of the support means 12.1 shown in FIG. 3. The outer profile of a support means pulley 4.2 with grooves 23.2 and ribs 22.2 corresponding with ribs 20.2 and grooves 21.2 of the support means 12.2 is also illustrated in FIG. 4 in phantom lines.

It is clearly recognizable from FIGS. 3 and 4 that in the case of both forms of the prior art the grooves 23.1, 23.2 and the ribs 22.1, 22.2 of the support means pulleys 4.1, 4.2 are formed to be fully complementary to the corresponding ribs 20.1, 20.2 and grooves 21.1, 21.2 of the support means 12.1, 12.2. This has the consequence that in operation the support means contacts the support means pulley along the entire cross-sectional profile formed by the ribs and grooves of the support means and the support means pulley, which has the consequence of the disadvantages described in the Background of the Invention and in the following.

As is generally known, a support means pulley used as drive pulley can transmit traction forces to a support means in the manner that the support means is radially pressed against the periphery of the drive pulley, wherein the attainable traction force corresponds with the product of the sum of the normal forces, which arise between the drive pulley and the support means, and the coefficient of friction which is present.

Radial force components transmitted in the region of the inclined flanks of the ribs 20.1, 22.1; 20.2, 22.2 and the grooves 21.1, 23.1; 21.2, 23.2 are amplified by the wedge effect between the flanks to produce higher normal forces which act on the flanks and which can produce higher traction forces than the radial force components transmitted substantially in radial direction. Since in the case of corresponding ribs and grooves, which are formed to be fully complementary, of the support means and the support means pulley it is not clearly defined which proportion of the radial forces, which arise between the support means and support means pulley, is transmitted in the region of the inclined flanks of the ribs and grooves and which proportion is transmitted in an approximately radial direction in the region of the rib crests and groove bases, in the case of a support means pulley serving as a drive pulley the resultant traction force on the one hand is not determinable with sufficient accuracy in advance and on the other hand as a consequence of plastic changes in shape and abrasion at the drive means is not constant over a longer operating period.

Moreover, it is readily apparent from FIGS. 3 and 4 that dirt and abraded material can collect in the grooves of the support means pulley 4.1, 4.2 as also in the grooves of the support means 12.1, 12.2 and are compacted and hardened by the tensioned support means. The traction capability and also the lateral guidance between the support means pulley and the support means can thereby be strongly prejudiced, which can have the consequence of serious operational disturbances.

Figure 5:
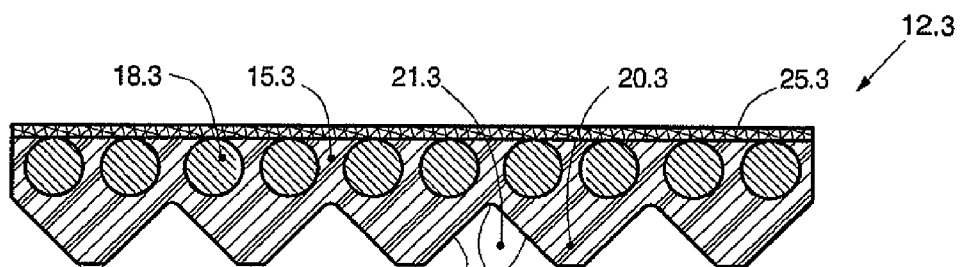
FIG. 5 is a sectional view through a support means according to the present invention.
Figure 6:
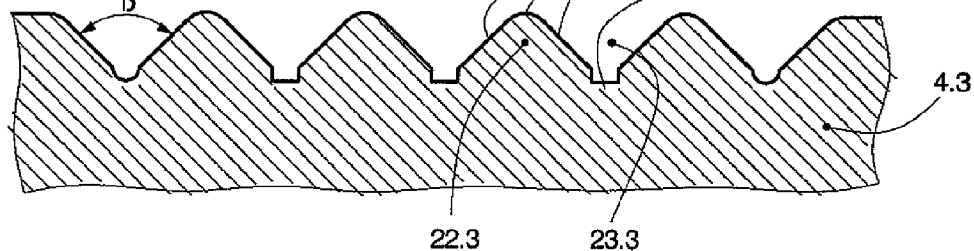
FIG. 6 is a sectional view through a periphery of a support means pulley according to the present invention for use with the support means shown in FIG. 5.
Figure 7:
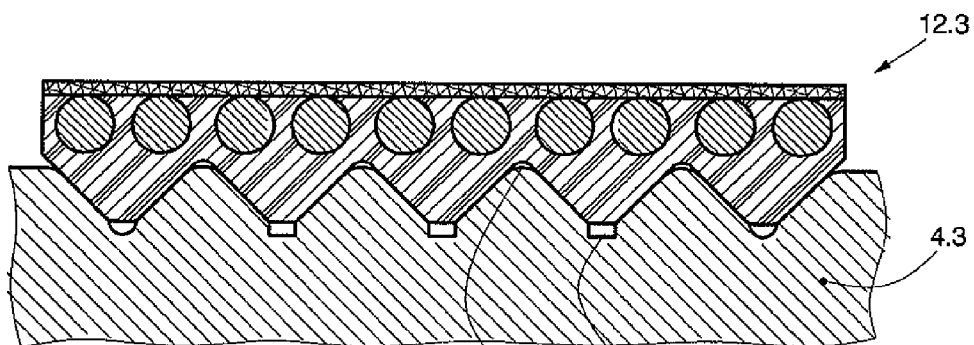
FIG. 7 is a sectional view of the belt pulley of FIG. 6 and the support means of FIG. 5 resting thereon.
Figure 8:
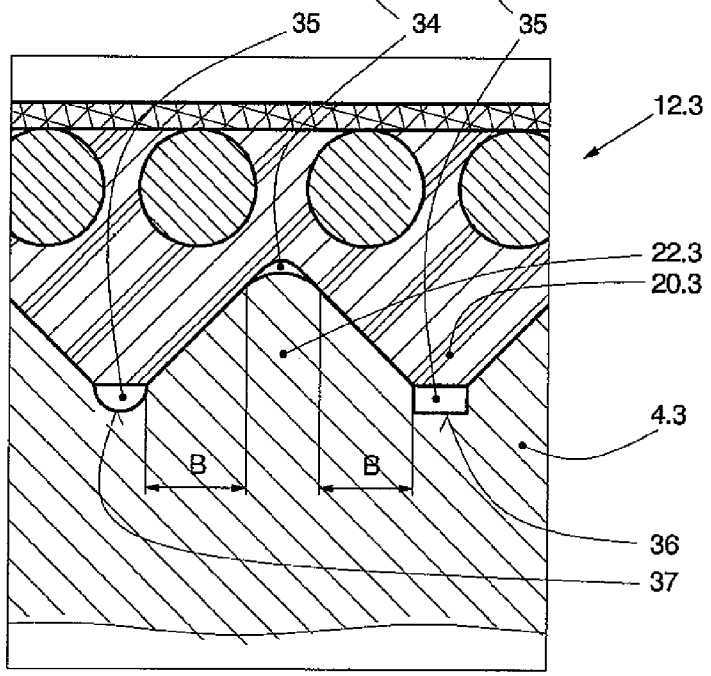
FIG. 8 is an enlarged detail of a portion of the belt pulley and support means shown in FIG. 7.

A section through a support means 12.3 according to the present invention is illustrated in FIG. 5 and the corresponding periphery of a support means pulley 4.3 according to the present invention is illustrated in FIG. 6. FIG. 7 shows a section through the support means 12.3 according to FIG. 5 and the support means pulley 4.3 according to FIG. 6 in a state in which the support means is, as a consequence of its loading in tension, pressed against the support means pulley. FIG. 8 shows an enlarged detail of FIG. 7 so as to make details recognizable.

The support means 12.3 illustrated in FIGS. 5 to 8 comprises a belt body 15.3 and several tensile carriers 18.3 embedded therein. The belt body 15.3 is made of a resilient material. Natural rubber, or any of a number of synthetic elastomers, for example, is usable. A flat side 17 of the belt body 15.1 can be provided with an additional cover layer 25.3, preferably a fabric layer. The support means 12.3 has several ribs and grooves which extend in its longitudinal direction and which on the one hand serve for lateral guidance of the support means on the support means pulley 4.3 and on the other hand improve the traction capability between the support means pulley and support means when the support means pulley is used as drive pulley.

It can be inferred from FIGS. 5 to 8 that the grooves 23.3 and ribs 22.3 of the support means pulley are not formed to be completely complementary to the corresponding ribs 20.3 and grooves 21.3 of the support means. In the regions in which rib crests 30, 31 are opposite groove bases 32, 33 cavities 34, 35 are present so that it is ensured that when the support means 12.3 is resting on the support means 4.3 the ribs 20.3 and the grooves 21.3 of the support means 12.3 and the corresponding grooves 23.3 and the corresponding ribs 22.3 of the support means 4.3 contact one another exclusively in the region of inclined flanks 28, 29 thereof. The radial forces acting between the support means 12.3 and the support means pulley 4.3 are through these measures transmitted with certainty exclusively by way of the inclined flanks 28, 29 of the ribs and the grooves, which have a constant and uniform flank angle β. It is therefore ensured that all radial force components arising between the support means and the support means pulley are amplified, as a consequence of the wedge effect caused by the inclined flanks, to produce increased normal forces between the flanks of the support means and the support means pulley. In the case of the support means pulley 4.3 serving as a drive pulley there results therefrom—as already described in the foregoing—an increased traction capability which is constant over a long operating time.

However, the cavities 34, 35 also have the purpose of receiving contaminations which deposit in the course of the elevator operation on the traction surfaces of the support means 12.3 and the support means pulley 4.3. It is thereby achieved that in the case of use of the support means pulley as a drive pulley the traction capability is not prejudiced and that in the case of all support means pulleys the lateral guidance, which is given by the co-operation of ribs and grooves of the support means and the support means pulley, of the support means on the support means pulleys is maintained. The cavities 34, 35 can be cleaned on the occasion of the elevator maintenance to be periodically carried out.

As shown in FIGS. 5 to 8, the cavities 34, 35 provided in accordance with the present invention in the region of the mutually opposite rib crests 30, 31 and the rib bases 32, 33 can be produced in different ways. In the interests of simplified illustration different forms of embodiment of the measures for producing cavities at the same support means and the same support means body are shown in FIGS. 6 to 8.

In the case of a particularly simple form of embodiment the rib crests 30 of the support means 12.3 or the rib crests 31 of the support means pulley 4.3 are for this purpose flattened.

According to a further embodiment, which is recognizable particularly from FIG. 8, the cavities 34 are produced in that the rib crests 30 of the ribs 20.3 of the support means 12.3 or the rib crests 31 of the ribs 22.3 of the support means pulley 4.3 are provided with a rounding, wherein the rounding radius of this rounding is substantially greater than the rounding radius of a rounding which may happen to be present at the groove base of the corresponding groove. Not only the rib crests of the support means, but also the rib crests of the support means pulley can be provided with such roundings. The forms of embodiment with strongly rounded rib crests have provided to be particularly low in wear and are distinguished by good running smoothness.

In the case of a form of embodiment, which is particularly suitable for elimination of contamination problems, of the invention the groove bases 33 of the wedge-shaped grooves 23.3 of the support means pulley 4.3 are deepened by encircling slots 36, 37 in the support means pulley, as is apparent particularly from FIG. 8. Such slots have the advantage that they can accept a substantial quantity of dirt. Advantageously, the slots 36, 37 have rectangular or semicircular cross-sections.

The widths, which are projected onto the axis of the support means pulley, of the inclined contact surfaces between the support means 12.3 and the support means pulley 4.3 are denoted in FIG. 8 by B. Tests have shown that it is advantageous to limit the sum of the widths B, which are projected onto the axis of the support means pulley 4.3, of all contacting flanks of the ribs and grooves, respectively, to at most 70% of the total width of the support means 12.3. It is thus achieved on the one hand that on every occasion all contact surfaces of the support means stand in full contact with the corresponding contact surfaces of the support means pulley, whereby an optimum stable, low-vibration and low-noise running of the support means 12.3 is achieved. Moreover, a sufficient area pressing in the region of the contact surfaces is ensured by the limitation of the projected total width of the contact surfaces. This pressing has, in the case of a drive pulley, the consequence of a lesser negative influencing of the traction behavior due to contamination such as oil, rust, dust grains, etc., since the contamination components due to the high area pressing are either displaced out of the contact region (preferably into the mentioned cavities) or—for example in the case of relatively coarse dust grains—forced by the drive pulley into the resilient material of the support means 12.3, so that the contact between the support means and the drive pulley 4.3 is maintained as best as possible.

The limitation of the said projected total width of the contact surfaces is preferably carried out by a selection of the width of the cavities 34, 35 according to the present invention between corresponding rib crests and groove bases.

The cavities 34, 35 according to the present invention between corresponding rib crests and groove bases have a further advantageous effect. In the case of a strong support means curvature the ribs 20.3 of the support means 12.3 are exposed in the region of the rib crests 30 to high compressive stresses, which have a consequence that the ribs bulge out in the region. This has the consequence that the ribs and the support means due to the wedge action between the inclined flanks are raised relative to the support means pulley 4.3, whereby the full contact between the ribs and grooves of the support means and the ribs and grooves of the support means pulley is lost. Resulting therefrom are increased slip between a support means pulley, which is used as drive pulley, and the support means, high support means wear and unsmooth running of the support means in the region of all support means pulleys.

The afore-mentioned cavities 34, 35 make it possible for the ribs of the support means to expand somewhat in the region of their rib crests into these cavities, whereby there is substantial mitigation of the described problem with small radii of curvature. This measure makes a significant contribution to the support means according to the present invention being able to be used in combination with support means pulleys with extremely small outer diameters. In concrete terms use can be made, as drive and deflecting pulleys, of support means pulleys having an outer diameter in the normal case of less than 80 millimeters, but if required even smaller than 65 millimeters. This makes it possible to integrate the drive pulley in the driven shaft of a drive unit or to couple it, in the form of a support means drive shaft, with the driven shaft of the drive unit.

In the case of the embodiment, which is shown in FIGS. 5 to 8, of the present invention the support means 12.3 has several parallel ribs and grooves which are arranged to be distributed over the entire width of the support means. However, a support means according to the present invention can also be provided with only a single rib or groove, which obviously also applies to the corresponding support means pulley. Advantageously, such a rib or groove in the case of the support means is arranged in the middle of the support means width, wherein the width of the rib or the groove is greater than and has a similar form to the ribs 20.2 of the support means illustrated in FIG. 4.

The support means illustrated in FIGS. 5 to 8 has a preferred flank angle β of approximately 90°. Tests have shown that the flank angle β has a decisive influence on the development of noise and the creation of vibrations in the support means and that flank angles β of 80° to 100° are optimal for an elevator support means. In the case of flank angles β of less than 60° the support means has a tendency to vibrations and at flank angles β of more than 100° the security against lateral displacement of the support means on the support means pulley is no longer guaranteed.

The support means system according to the present invention is described in the foregoing in conjunction with use in an elevator installation in the sense of an example and not in the sense of a limitation. The expert will, with knowledge of the present invention, recognize further variants of use and embodiment lying within the field of protection of the patent claims.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A support means system, in which a support means pulley drives or deflects at least one support means belt supporting a load, wherein the support means belt has in the region of a running surface facing the support means pulley at least one rib which extends in a longitudinal direction of the support means belt and which has a wedge-shaped cross-section with inclined flanks, and the support means pulley has in the region of its periphery at least one corresponding groove which extends in a circumferential direction and which similarly has a wedge-shaped cross-section with inclined flanks and co-operates with the at least one rib of the support means belt, wherein:

the at least one rib of the support means belt has a flattened rib crest and the at least one corresponding groove of the support means pulley has a groove base with an encircling slot formed therein, said encircling slot having a wall joining the inclined flanks of the at least one corresponding groove at an angle of inclination different from an angle of inclination of the joined inclined flanks, said rib crest and said slot being configured to form a cavity therebetween when the support means belt rests on the support means pulley.

2. The support means system according to claim 1 wherein when the support means belt rests on the support means pulley the at least one rib having said rib crest and the at least one corresponding groove having said groove base contact one another exclusively in a region of the inclined flanks thereof.

3. The support means system according to claim 1 wherein the support means pulley includes at least one rib having a rounded rib crest and the support means belt includes at least one corresponding groove having a rounded groove base, a rounding radius of said rib crest being greater than a rounding radius of said groove base.

4. The support means system according to claim 1 wherein the support means belt has several parallel ribs and grooves with inclined flanks, which correspond with several parallel grooves and ribs with inclined flanks at a periphery of the support means pulley, wherein when the support means belt rests under tensile stress on the support means pulley and the support means belt and the support means pulley contact one another exclusively in a region of the said inclined flanks.

5. The support means system according to claim 4 wherein a flank angle between flanks of each of said ribs and said grooves is in a range of 60° to 120°.

6. The support means system according to claim 5 wherein said ribs and grooves are shaped such that a sum of widths, which are projected onto an axis of the support means pulley, of all contacting flanks is at most 70% of a total width of the support means belt.

7. The support means system according to claim 1 wherein the support means pulley has an outer diameter of less of than 80 millimeters.

8. The support means system according to claim 1 wherein the support means pulley has an outer diameter of less of than 65 millimeters.

9. The support means system according to claim 1 wherein the support means pulley is a drive pulley of an elevator drive unit.

10. An elevator installation with a support means system for supporting and driving an elevator car comprising:

a support means belt for supporting a load, wherein said support means belt has a running surface with a plurality of ribs and grooves which extend in a longitudinal direction of the support means belt and which have a wedge-shaped cross-section with inclined flanks; and a support means pulley having formed in a periphery a plurality of corresponding grooves and ribs which extend in a circumferential direction and which similarly have a wedge-shaped cross-section with inclined flanks and co-operate with said ribs and grooves of said support means belt;

wherein at least one of said ribs of said support means belt has a flattened rib crest and said corresponding groove of said support means pulley has a groove base with an encircling slot formed therein, said encircling slot having a wall joining said inclined flanks of said corresponding groove at an angle of inclination different from an angle of inclination of said Joined inclined flanks, said rib crest and said slot being configured to form a cavity therebetween when said support means belt rests on said support means pulley.

11. The elevator installation according to claim 10 wherein when said support means belt rests on said support means pulley said ribs and said grooves contact one another exclusively in a region of said inclined flanks thereof.

12. The elevator installation according to claim 10 wherein said ribs of said support means pulley each have a rounded rib crest and said grooves of said support means belt each have a rounded groove base, a rounding radius of said rounded rib crests being greater than a rounding radius of said rounded groove bases.

13. A support means system, in which a support means pulley drives or deflects at least one support means belt supporting a load, wherein:

the support means belt has in a region of a running surface facing the support means pulley at least one rib and at least one groove each of which extends in a longitudinal direction of the support means belt and which has a wedge-shaped cross-section with inclined flanks;

the support means pulley has in a region of its periphery at least one groove and at least one rib each of which extends in a circumferential direction and which has a wedge-shaped cross-section with inclined flanks, said at least one rib of said support means belt co-operating with said at least one groove of said support means pulley and said at least one rib of said support means pulley co-operating with said at least one groove of said support means belt;

said at least one rib of said support means belt has a flattened rib crest and said at least one groove of said support means pulley has a groove base with a circumferential slot configured to form a cavity in co-operation with said flattened rib crest when the support means belt rests on the support means pulley, said slot having a wall joining said inclined flanks of said at least one groove of said support means pulley at an angle of inclination different from an angle of inclination of said joined inclined flanks; and said at least one rib of said support means pulley has a rounded rib crest and said at least one groove of said support means belt has a rounded groove base configured to form a cavity in co-operation with said rounded rib crest when the support means belt rests on the support means pulley.

14. The support means system according to claim 13 wherein said slot of said groove base of said support means pulley has a semicircular cross-section or rectangular cross-section.

15. The support means system according to claim 13 wherein said slot of said groove base of said support means pulley has a width equal to a width of said flattened rib crest.

16. The support means system according to claim 1 wherein said encircling slot has a semicircular cross-section.

17. The support means system according to claim 1 wherein said encircling slot has a rectangular cross-section.

18. The support means system according to claim 10 wherein said encircling slot has a semicircular cross-section.

19. The support means system according to claim 10 wherein said encircling slot has a rectangular cross-section.

* * * * *